United States Patent
Hanckel et al.

(10) Patent No.: US 9,589,036 B2
(45) Date of Patent: Mar. 7, 2017

(54) QUERY-LEVEL ACCESS TO EXTERNAL PETABYTE-SCALE DISTRIBUTED FILE SYSTEMS

(75) Inventors: Robert Hanckel, Amherst, NH (US); Garret Swart, Palo Alto, CA (US)

(73) Assignee: Oracle International Corporation, Redwood Shores, CA (US)

( * ) Notice: Subject to any disclaimer, the term of this patent is extended or adjusted under 35 U.S.C. 154(b) by 332 days.

(21) Appl. No.: 13/564,204

(22) Filed: Aug. 1, 2012

(65) Prior Publication Data

US 2014/0040310 A1 Feb. 6, 2014

(51) Int. Cl.
*G06F 17/30* (2006.01)

(52) U.S. Cl.
CPC .............................. *G06F 17/30557* (2013.01)

(58) Field of Classification Search
CPC ......... G06F 17/30864; G06F 17/30595; G06F 17/30067; G06Q 30/02
USPC ........................................................ 707/770
See application file for complete search history.

(56) References Cited

U.S. PATENT DOCUMENTS

| | | | |
|---|---|---|---|
| 6,393,435 B1 * | 5/2002 | Gartner et al. | |
| 6,505,199 B1 * | 1/2003 | Nakano et al. | |
| 6,523,172 B1 * | 2/2003 | Martinez-Guerra et al. . | 717/143 |
| 7,020,888 B2 * | 3/2006 | Reynolds et al. ............... | 725/34 |
| 8,489,609 B1 * | 7/2013 | Ong .................. G06F 17/30321 | 707/741 |
| 2005/0177829 A1 * | 8/2005 | Vishwanath ................... | 717/177 |
| 2011/0314019 A1 * | 12/2011 | Jimenez Peris et al. ..... | 707/737 |
| 2012/0239612 A1 * | 9/2012 | George et al. ................ | 707/602 |
| 2013/0166566 A1 * | 6/2013 | Lemke .............. G06F 17/30483 | 707/741 |
| 2013/0174048 A1 * | 7/2013 | Xu ................................. | 715/748 |

OTHER PUBLICATIONS

Hadoop Wiki, "Mounting HDFS", Jan. 11, 2012, 5 pages.
Oracle Corporation, "12 External Tables Concepts", Oracle Database Utilities, 10g Release 2 (10.2), 2005, 8 pages.
Alex Handy, "Big Data", Software Development Times, Jun. 2012, Issue No. 278, pp. 24-26 and 29-30.
The Apache Software Foundation, "HDFS Federartion", Hadoop Distributed File System—2.0.0-alpha—Federation, May 16, 2012, 4 pages.

* cited by examiner

*Primary Examiner* — Scott A Waldron
*Assistant Examiner* — Dongming Wang
(74) *Attorney, Agent, or Firm* — Vista IP Law Group, LLP (57) ABSTRACT

A system to implement query-level access by a database engine to an external distributed file system by identifying a results file location of one or more results files on the external distributed file system, and storing the results file locations in external table files on the database engine for subsequent use during retrieval of data from the results files. The database engine serves to process queries where the query specifies the external table (which in turn references locations of the results files). Execution of the query streams data from the external distributed file system into the database engine. The data from the external distributed file system is not stored in the external table files on the database engine; rather, the external table files specify a location of code or operational directives which, when executed, streams results from the external distributed file system to at least one parallel query engine.

20 Claims, 6 Drawing Sheets

QUERY-LEVEL ACCESS TO EXTERNAL PETABYTE-SCALE DISTRIBUTED FILE SYSTEMS

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD

The disclosure relates to the field of relational database systems and more particularly to techniques for query-level access to external petabyte-scale distributed file systems.

BACKGROUND

Some embodiments of the present disclosure are directed to an improved approach for implementing query-level access to external petabyte-scale distributed file systems.

With the explosion of online accessible data comes the need for huge data repositories. Such repositories are augmented daily, and many have aggregate sizes on the petabyte (and larger) range. In some cases although a huge amount of data can be made accessible, it is often the case that only a portion of the huge data is needed for any particular application or analysis. It is often also the case that the aforementioned particular application or analysis is conveniently implemented in a database engine (e.g., an Oracle™ system). Accordingly it would be convenient to access such huge data (e.g., as stored in an external "big data appliance") from within such a database engine.

Legacy approaches have partially addressed the function of query-level access to external data through use of a query language construction called "external tables". Legacy implementations of external table constructions in a database engine query have provided the limited function of importing data from an external system and bringing it into storage locations within the database engine. While this technique can be used for modestly-sized datasets, or even for large datasets, use with petabyte-sized data stores introduces new problems to be solved. Indeed, although external tables are convenient for importing modestly-sized datasets, or even for large datasets from a location stored outside of a database engine into standard database engine tables, using legacy techniques, it can be impractical to do so for petabyte or larger datasets that are common in big data appliances.

Certain legacy approaches have been touted: One approach is to build an application that reads from the big data appliance (e.g., a Hadoop file system file) and write the contents of the file to a disk that is accessible to database engine. The database engine can then map the file on disk to an external table. This technique imposes additional IO overhead that worsens as the size of the file on disk grows. In some cases, the IO overhead increases by a factor of three. That is, data is read from the external big data repository, and then written to a local disk before being processed by the database engine via a query (e.g., using the aforementioned external table construction). Very often big data appliance files are large so this IO overhead is substantial. Similarly, often big data appliance files are so large (e.g., multiple petabytes and larger) that it is impractical to host an entire copy of the big data within the database engine (e.g., usually smaller than petabytes).

Another approach is to rely on data storage from within a user space (e.g., using a Linux File System in User Space). This technique spoofs files so they appear as local files. This approach requires operating system "root" administration privilege to install, and as such, this approach incurs a substantial performance penalty, at least because it requires software layers between the user space and the database engine, which in turn incurs switching between software layers. Moreover, often big data appliance files are so large that it is expensive and/or impractical to replicate an entire copy of the big data. Still more, legacy techniques often require buffer copies between buffers resident in one environment (e.g., within a Java virtual machine) and buffers resident in another environment (e.g., within a C implementation above the Java virtual machine).

Techniques are needed to provide database engine access to petabyte-scale files while avoiding the aforementioned impracticalities and performance impacts.

SUMMARY

The present disclosure provides an improved method, system, and computer program product suited to address the aforementioned issues with legacy approaches. More specifically, the present disclosure provides a detailed description of techniques used in methods, systems, and computer program products for query-level access to external petabyte-scale distributed file systems.

A method, system, and computer program product for relational database systems. The system serves to implement query-level access by a database engine to an external distributed file system by identifying a results file location of one or more results files on the external distributed file system, and storing the results file location(s) in external table files on the database engine. The database engine serves to process a query where the query specifies the external table files (which in turn references the location of the results files). Execution of the query serves to retrieve data from the external distributed file system. The data from the external distributed file system is not stored in the table files on the database engine; rather, the external table files specify a location of code or operational directives which, when executed, streams results from the external distributed file system to at least one parallel query engine.

Further details of aspects, objectives, and advantages of the disclosure are described below in the detailed description, drawings, and claims. Both the foregoing general description of the background and the following detailed description are exemplary and explanatory, and are not intended to be limiting as to the scope of the claims.

DETAILED DESCRIPTION

Some embodiments of the present disclosure are directed to an improved approach for implementing query-level access to external petabyte-scale distributed file systems. More particularly, disclosed herein are environments, methods, and systems for implementing query-level access to external petabyte-scale distributed file systems.
Overview This disclosure extends the concept of database engine "external tables" so as to work with big data appliances (e.g., Hadoop) and allows structured data to be accessed directly from an external file system (e.g., HDFS) while executing a query within a database engine.

As used herein, external tables are defined as tables that do not reside within the database. External tables can be in any format, and can be converted or translated into a table format suited for the database engine. In some cases an access driver is provided to perform translation from an external format to a table format suited for the database engine.

To address some of the aforementioned deficiencies of legacy approaches, embodiments as discussed herein refer to (e.g., by reference or by metadata specifications) and provide access to (e.g., via a query statement) the contents of the external tables, yet without copying the referenced data to the storage disks of the database system.

By providing the database with metadata describing an external table, the database is able to access the data in the external table as if it were data residing in a regular database table, yet without copying the referenced data to the storage disks of the database system. Accordingly, the external data can be queried directly as a table in a query language (e.g., SQL) and the external data can be processed in parallel (e.g., using implicit parallelization in an SQL query, or via explicit declarations). More particularly, a database user can take full advantage of SQL, and can use database engine facilities such as PL/SQL, and Java to query an external table. Using an SQL query, a user can, for example, specify a select operation, a join operation, or sort operation on data from an external table. One can also create views and synonyms referring to one or more external tables.

In exemplary cases as further disclosed herein, the use of external tables referring to stores on big data appliances provide a valuable technique for performing extraction, transformation, and loading (ETL)—tasks that are common for data warehousing. The data from an external table can be prepared for loading into a database engine table by using the statement:

```
CREATE TABLE mytable
    AS SELECT * FROM my_external_table;          (Statement 1)
```

The operation of Statement 1 creates a database engine table "mytable" to be populated using content from outside of the database engine, namely via the external table "my_external_table".

In this example, and as in embodiments further described below, the external table feature allows the creation of database engine external tables which access content stored in the big data appliance (e.g., an Apache Hadoop Distributed File System) yet without requiring a copy of the entire contents to the database engine. Further embodiments, support parallel processing so as to balance the load over the database engine's parallel execution model.

Descriptions of Exemplary Embodiments

Figure 1:
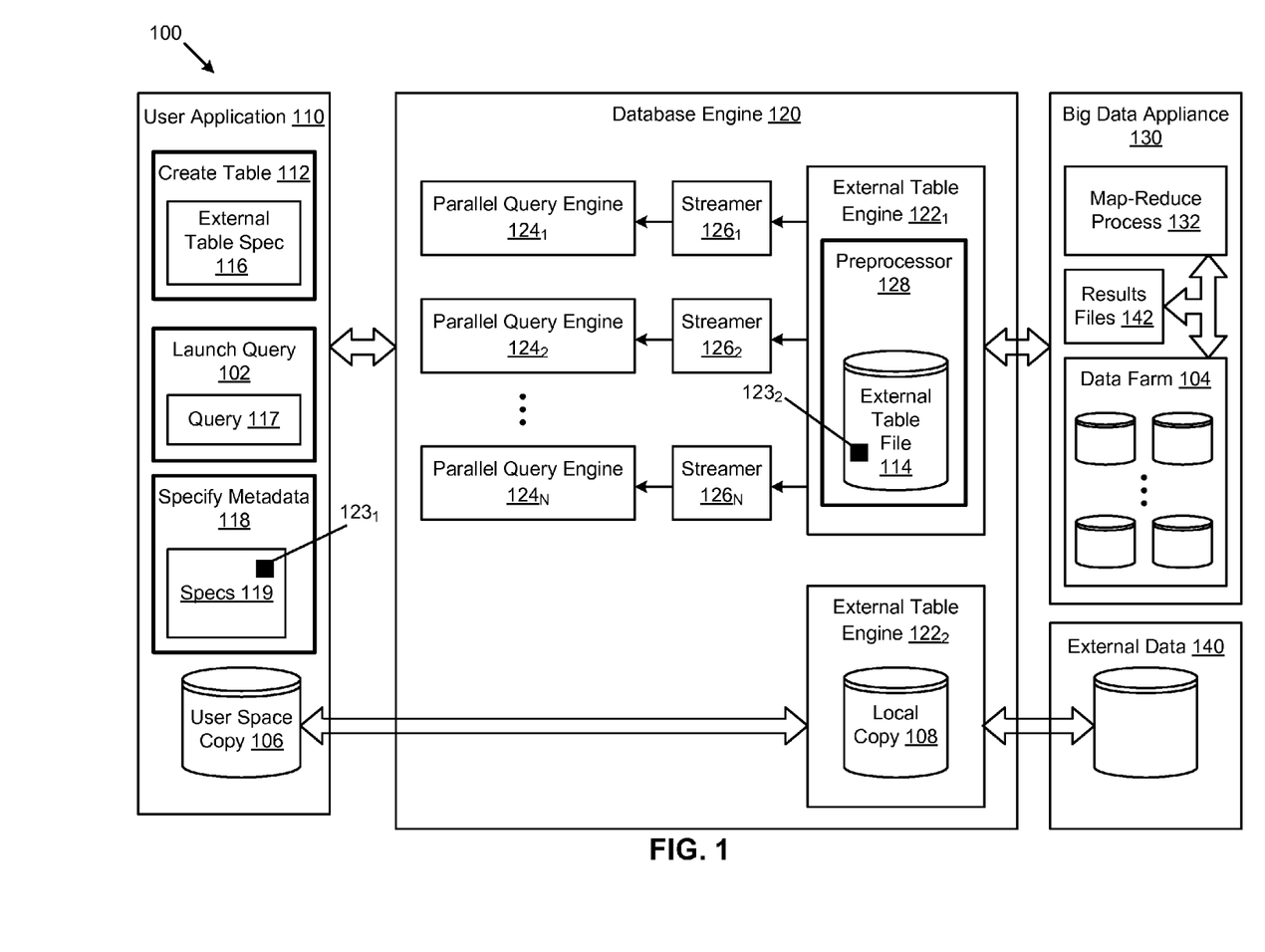
FIG. 1 is a block diagram of a system for query-level access to external petabyte-scale distributed file systems, according to some embodiments.

FIG. 1 is a block diagram of a system 100 for query-level access to external petabyte-scale distributed file systems. As an option, the present system 100 may be implemented in the context of the architecture and functionality of the embodiments described herein. Also, the system 100 or any aspect therein may be implemented in any desired environment.

The embodiment of FIG. 1 depicts a database engine 120 (e.g., an Oracle database system) in communication with a big data appliance 130 (e.g., Hadoop Cluster). Also shown is a user application 110, which user application supports operations such as operations shown as create table 112, launch query 102, and specify metadata 118. Correspondingly, the operations to create table 112, launch query 102, and specify metadata 118 serve to codify an external table spec 116, construct a query 117, and codify specifications 119, including metadata (e.g., metadata $123_1$) for storing in an external table file (e.g., as metadata $123_2$).

As earlier mentioned, one technique for accessing external data (e.g., external data 140, as shown) is to make a copy of the external data, either within the database engine using an external table engine $122_2$ (e.g., see local copy 108) or within the user space (e.g., see user space copy 106).

However, as the data to be accessed grows, so does the need for accessing petabyte-scale data via a big data appliance 130, which big data appliance may implement a data farm 104, and a map-reduce process 132. In some situations a big data appliance may comprise a map-reduce process to access huge and disparately located data (e.g., in the data farm 104) and populate the results of certain map-reduce operations into results files. Such results can be stored in results files 142, and can be accessed by an external table engine $122_1$. More specifically, a preprocessor 128 can process data from results files, perform operations based on the metadata within an external table file 114, and stream the pre-processed data to one or more streams, whose output is destined for a receiving application (e.g., user application 110).

As in the example above, a big data appliance can be implemented as a Hadoop cluster. Hadoop is an open source software package that is administered by the Apache Software Foundation. It implements the map-reduce programming model that is a parallel programming model to process and transform large amounts of data. The data is stored in Hadoop Distributed File System (HDFS).

Continuing the Hadoop example, in operation, a user commences to create a table that uses an external table construction to specify where the file location is in HDFS. External tables are created using declarative statements (e.g., see Statement 1). Such statements in turn are executed by modules within the database engine, and such modules within the database engine can support a variety of file types (e.g., dumpfiles).

Queries referencing external tables that have been created using the abovementioned declarative statements operate differently from legacy database engine models of external tables in that the data referenced in the declarative statements do not refer to the location of the file or files in the external big data appliance. Rather, the data referenced in the declarative statements refer to a file or files comprising metadata.

Continuing this example, and using SQL syntax, files can be specified in a "LOCATION" clause. In exemplary embodiments of systems for query-level access to external petabyte-scale distributed file systems, the files specified in the "LOCATION" clause (i.e., location files) contain metadata directives for how to access the external table data rather than containing the external file data itself. Such metadata provides references to big data repositories (e.g., HDFS content) and the metadata can comprise custom instructions and/or operational directives (e.g., location of code, etc.) used to alter default behavior. For example, the metadata can comprise custom instructions referring to the location of code to execute operational directives. The location files can be updated and redirected to different big data repositories (e.g., to new HDFS content) without having to redefine the external table statements. The operational directives can also include codec specifications. For instance, the metadata can declare a codec which will be used to unzip compressed content retrieved from HDFS. In some embodiments, metadata populated into one or more external table files on the database engine includes metadata specifying a location of code to execute operational directives. Additional uses and implementations of operational directives are disclosed infra (see FIG. 3).

Such operational directives can be applied to the incoming data from the external table using a preprocessor 128, which in turn serves to parallelize downstream processing. Strictly as an example downstream processing can comprise streaming portions of the data into one or more streamers (e.g., streamer 126₁, streamer 126₂, streamer 126$_N$, etc.), which in turn provide streaming data to respective parallel query engines (e.g., parallel query engine 124₁, parallel query engine 124₂, parallel query engine 124$_N$, etc.).

Thus, a database system serves for executing a query (e.g., using SQL syntax), where the query specifies a table corresponding to one or more location files.

Figure 2:
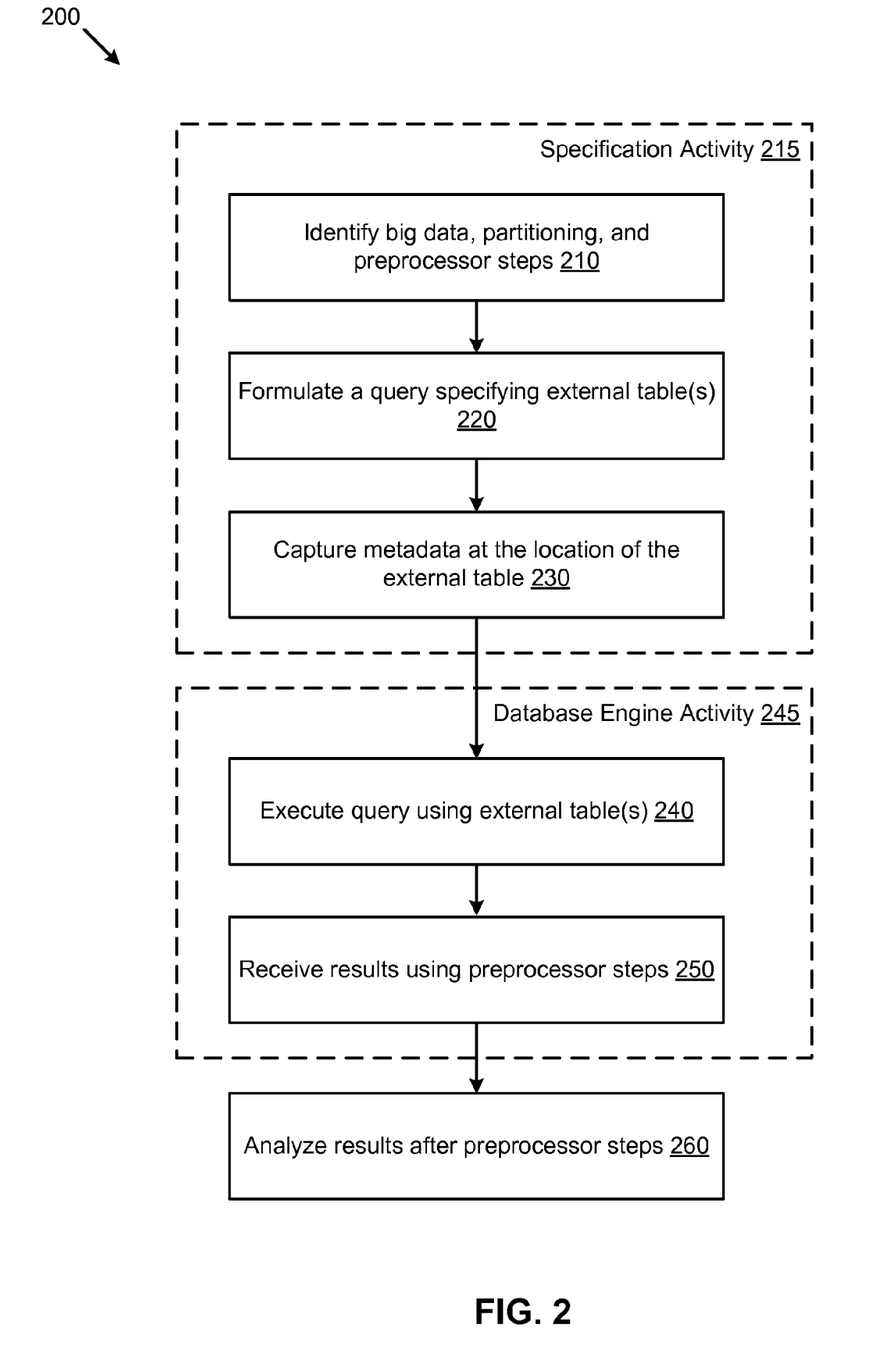
FIG. 2 depicts a use model for query-level access to external petabyte-scale distributed file systems, according to some embodiments.

Additional operations, specifications and sample directives are further discussed vis-à-vis FIG. 2.

FIG. 2 depicts a use model 200 for query-level access to external petabyte-scale distributed file systems. As an option, the present use model 200 may be implemented in the context of the architecture and functionality of the embodiments described herein. Also, the use model 200 or any aspect therein may be implemented in any desired environment.

As shown the above mechanisms comprise multiple activities as depicted in the sequence of operations from operation 210 through operation 260. A specification activity 215 includes:
  Identifying the location of the relevant external data, identifying partitioning, and identifying preprocessor steps (see operation 210);
  Formulate a query specifying external table(s) and respective metadata (see operation 220);
  Capture metadata at the location of the external table (see operation 230).

Then, a database engine can serve to perform retrieval and preprocessing steps (see database engine activity 245):
  Execute the query using the external table(s) (see operation 240);
  Receive results (see operation 250).

Once the data has been streamed and processed (possibly using multiple instances of a parallel query engine 124) the amalgamated data can be analyzed (see operation 260).

Figure 3:
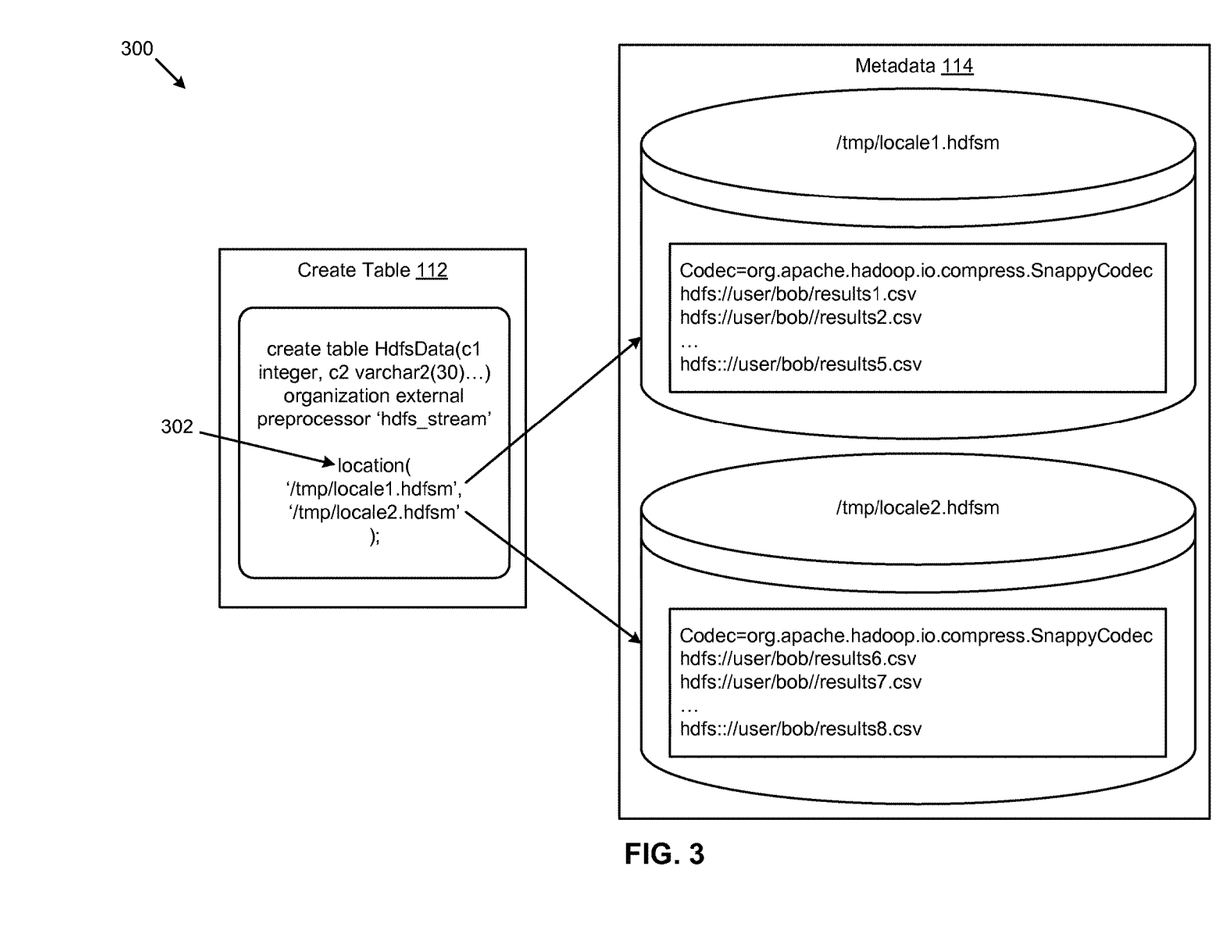
FIG. 3 depicts a metadata creation technique in a flow for query-level access to external petabyte-scale distributed file systems, according to some embodiments.

FIG. 3 depicts a metadata creation technique in a flow 300 for query-level access to external petabyte-scale distributed file systems. As an option, the present flow 300 may be implemented in the context of the architecture and functionality of the embodiments described herein. Also, the flow 300 or any aspect therein may be implemented in any desired environment.

As shown, one technique for defining the metadata for external tables is through the create table operation (see create table 112), possibly in conjunction with a specify metadata operation, and possibly using clauses such as CREATE TABLE, and ORGANIZATION EXTERNAL in declarative statements. Such an external table definition can be thought of as a view that allows running any SQL query against external data without requiring that the external data first be loaded into the database. An access driver is the actual mechanism used to read the external data in the table. When using external tables to access external data, the metadata is automatically created based on the data types in the SELECT statement.

The create table operation establishes various attributes of table being created, and specifies the location (e.g., via pathname) of the storage areas comprising the metadata such as an external table file 114. Thus, a database system can serve for executing a query (e.g., using SQL syntax), where the query specifies a table corresponding to one or more location files (e.g., external table files).

The LOCATION attribute (see location attribute 302) in an external table definition specifies the data files for the external table. The files are named in the form of "directory: file". The directory portion is optional, in which case a default directory is used as the directory for the file. An external table can specify multiple location files (as shown), in which case each instance of the multiple location files can stream to a respective parallel query engine. Strictly as one example, location files can be populated by a publishing tool, which publishing tool analyses a set of result files residing in HDFS and considers one or more load balancing schemes. One such technique facilitates load balancing at file level granularity. As can be understood, for implementing load balancing at file level granularity, if the external table file(s) refer to five location files, and there are 20 HDFS files of equal size being referenced, then each of the five location files will contain four (e.g., 20/5=4) HDFS file references as metadata. In some applications of this file level load balancing scheme, the algorithm for populating these files operates in a "greedy" mode in that it sorts the files by size, populates the biggest file into the first location file, and then populates the other location files with other file references while keeping track of how much load each location file references, and trying to keep the load as even as possible with each population. Further, the contents of metadata can include a codec (e.g., the codec found at org.apache.hadoop.io.compress.CompressionCodec) for performing operations before, during, or after accessing the location files.

Figure 4:
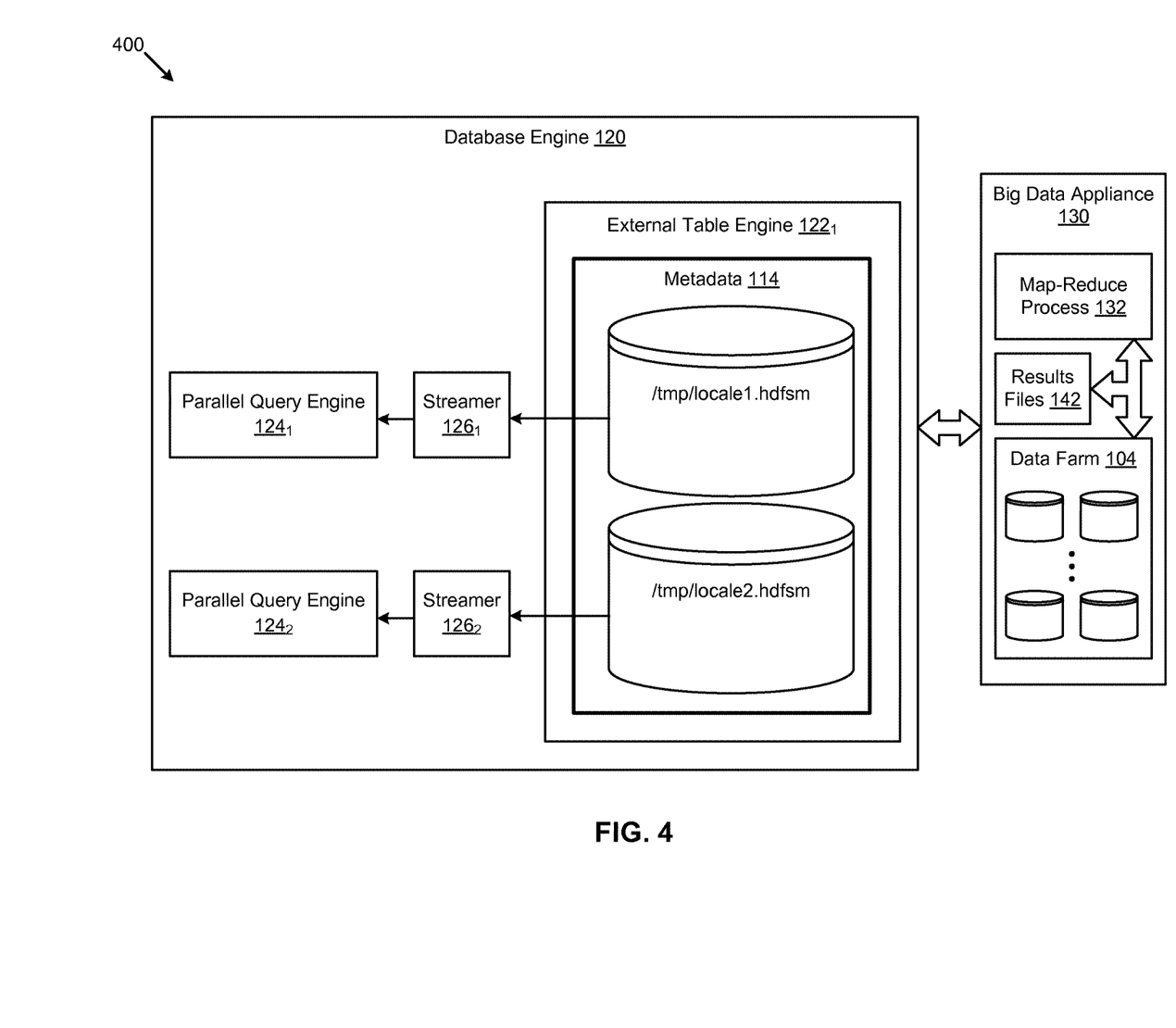
FIG. 4 exemplifies a caching and refresh technique in a flow for query-level access to external petabyte-scale distributed file systems, according to some embodiments.

FIG. 4 exemplifies a caching and refresh technique in a flow 400 for query-level access to external petabyte-scale distributed file systems. As an option, the present flow 400 may be implemented in the context of the architecture and functionality of the embodiments described herein. Also, the flow 400 or any aspect therein may be implemented in any desired environment.

As earlier indicated, the external table feature allows the creation of database engine external tables which access content stored in the big data appliance (e.g., an Apache Hadoop Distributed File System) yet without requiring a copy of the entire contents to the database engine. As shown, the embodiment of FIG. 4 supports parallel processing so as to balance the load over the database engine's parallel execution model.

The embodiment shows two parallel processing paths (e.g. see parallel query engine $124_1$, parallel query engine $124_2$, and their respective streamer instances (e.g., streamer $126_1$ and streamer $126_2$), however any number of parallel processing paths are possible.

Again referring to the embodiment of FIG. 4, results files 142 are produced by the big data appliance 130, which results are stored in multiple files, namely (for this example) in files named by a pathname such as "hdfs://user/bob/results1.csv", or (for another example) "hdfs://user/bob/results2.csv" (see the contents of the metadata as shown in FIG. 3) and so on. The result data found in such results files are streamed through a streamer and into a parallel query engine. In this example, the streaming of results from results files is on a one-to-one basis.

Some embodiments include a Java command line tool to publish the HDFS path URIs into the location files of an existing external table. When queries are performed on the external table, the preprocessor uses the path URIs from location files to locate and stream content from HDFS to the external table.

In exemplary operation of this feature, the external table is created using a preprocessor clause, such as HDFS_BIN_PATH:hdfs_stream, where HDFS_BIN_PATH is the database engine directory name where this feature is installed and hdfs_stream is name of the processor script. This preprocessor clause indicates that the table is a Direct HDFS external table.

Example

```
CREATE TABLE "SCOTT"."SALES_HDFS_EXT_TAB"
(  "PROD_ID"        NUMBER(6),
   "CUST_ID"        NUMBER,
   "TIME_ID"        DATE,
   "CHANNEL_ID"     CHAR(1),
   "PROMO_ID"       NUMBER(6),
   "QUANTITY_SOLD"  NUMBER(3),
   "AMOUNT_SOLD"    NUMBER(10,2)
)
ORGANIZATION EXTERNAL
( TYPE LOADER
  DEFAULT DIRECTORY "SALES_EXT_DIR"
  ACCESS PARAMETERS
  (    EXTERNAL VARIABLE DATA
    PREPROCESSOR "HDFS_BIN_PATH:hdfs_stream"
  )
  LOCATION ( 'sales1','sale2','sales3')
);
```

Additional Embodiments of the Disclosure

Figure 5:
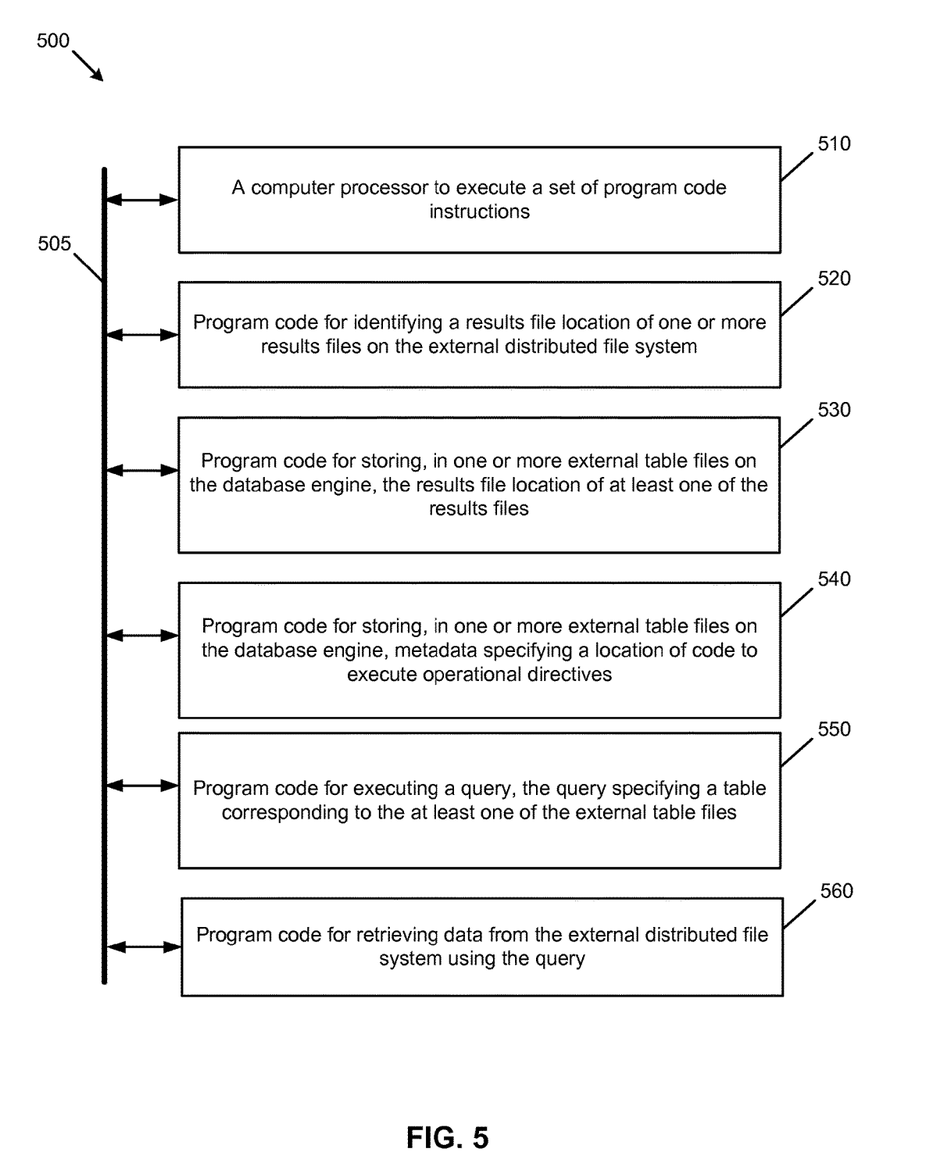
FIG. 5 depicts a block diagram of a system to perform certain functions of a computer system, according to some embodiments.

FIG. 5 depicts a block diagram of a system to perform certain functions of a computer system. As an option, the present system 500 may be implemented in the context of the architecture and functionality of the embodiments described herein. Of course, however, the system 500 or any operation therein may be carried out in any desired environment. As shown, system 500 comprises at least one processor and at least one memory, the memory serving to store program instructions corresponding to the operations of the system. As shown, an operation can be implemented in whole or in part using program instructions accessible by a module. The modules are connected to a communication path 505, and any operation can communicate with other operations over communication path 505. The modules of the system can, individually or in combination, perform method operations within system 500. Any operations performed within system 500 may be performed in any order unless as may be specified in the claims. The embodiment of FIG. 5 implements a portion of a computer system, shown as system 500, comprising a computer processor to execute a set of program code instructions (see module 510) and modules for accessing memory to hold program code instructions to perform: identifying a results file location of one or more results files on the external distributed file system (see module 520); storing, in one or more external table files on the database engine, the results file location of at least one of the results files (see module 530); storing, in the one or more external table files on the database engine, metadata specifying a location of code to execute operational directives (see module 540); executing a query, the query specifying a table corresponding to the at least one of the external table files (see module 550); and retrieving data from the external distributed file system using the query (see module 560).

Figure 6:
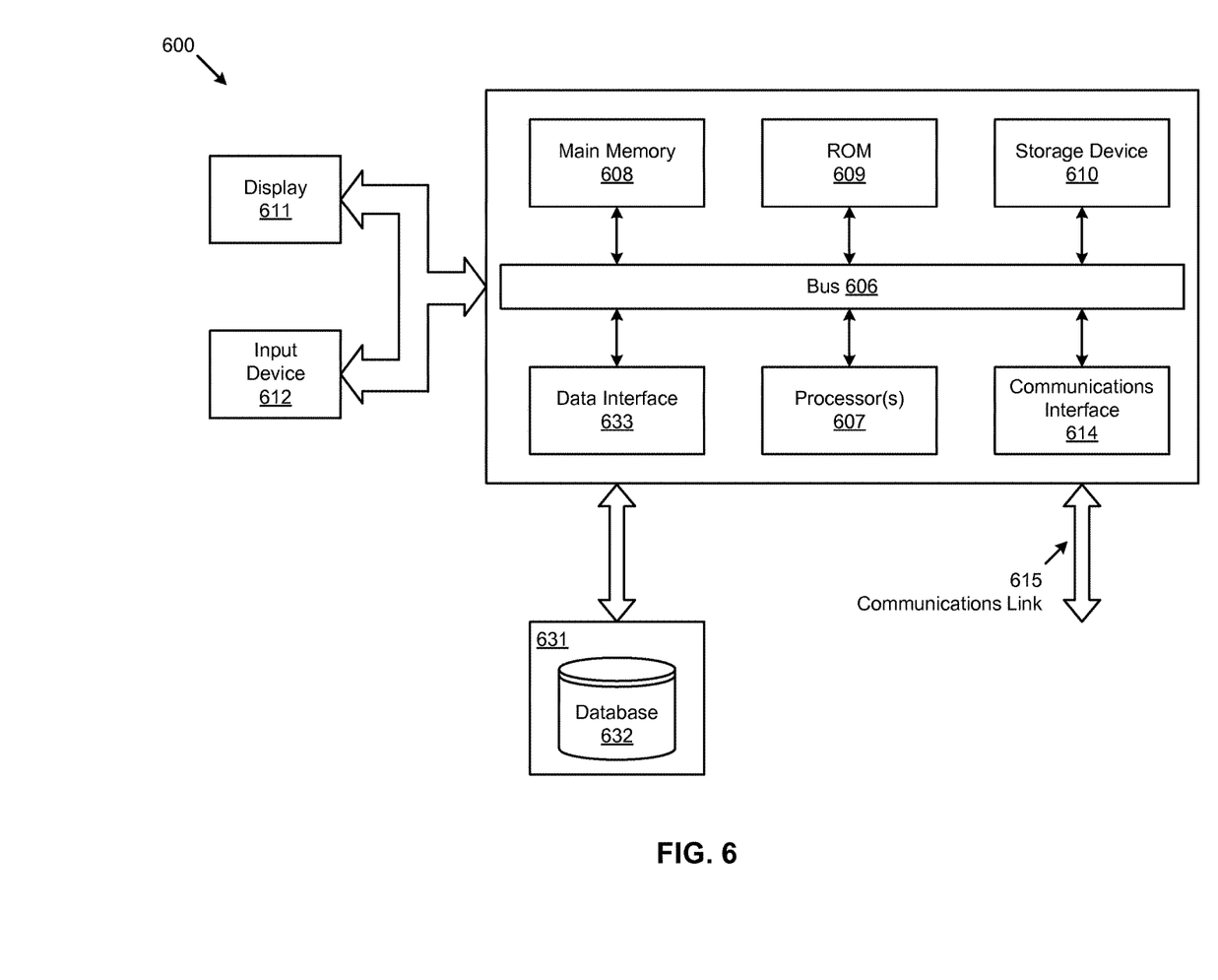
FIG. 6 depicts a block diagram of an instance of a computer system suitable for implementing an embodiment of the present disclosure.

FIG. 6 depicts a block diagram of an instance of a computer system 600 suitable for implementing an embodiment of the present disclosure. Computer system 600 includes a bus 606 or other communication mechanism for communicating information, which interconnects subsystems and devices, such as a processor 607, a system memory 608 (e.g., RAM), a static storage device (e.g., ROM 609), a disk drive 610 (e.g., magnetic or optical), a data interface 633, a communication interface 614 (e.g., modem or Ethernet card), a display 611 (e.g., CRT or LCD), input devices 612 (e.g., keyboard, cursor control), and an external data repository 631.

According to one embodiment of the disclosure, computer system 600 performs specific operations by processor 607 executing one or more sequences of one or more instructions contained in system memory 608. Such instructions may be read into system memory 608 from another computer readable/usable medium, such as a static storage device or a disk drive 610. In alternative embodiments, hard-wired circuitry may be used in place of or in combination with software instructions to implement the disclosure. Thus, embodiments of the disclosure are not limited to any specific combination of hardware circuitry and/or software. In one embodiment, the term "logic" shall mean any combination of software or hardware that is used to implement all or part of the disclosure.

The term "computer readable medium" or "computer usable medium" as used herein refers to any medium that participates in providing instructions to processor 607 for execution. Such a medium may take many forms, including but not limited to, non-volatile media and volatile media. Non-volatile media includes, for example, optical or magnetic disks, such as disk drive 610. Volatile media includes dynamic memory, such as system memory 608.

Common forms of computer readable media includes, for example, floppy disk, flexible disk, hard disk, magnetic tape, or any other magnetic medium; CD-ROM or any other optical medium; punch cards, paper tape, or any other physical medium with patterns of holes; RAM, PROM, EPROM, FLASH-EPROM, or any other memory chip or cartridge, or any other non-transitory medium from which a computer can read data.

In an embodiment of the disclosure, execution of the sequences of instructions to practice the disclosure is performed by a single instance of the computer system 600. According to certain embodiments of the disclosure, two or more computer systems 600 coupled by a communications link 615 (e.g., LAN, PTSN, or wireless network) may perform the sequence of instructions required to practice the disclosure in coordination with one another.

Computer system 600 may transmit and receive messages, data, and instructions, including programs (e.g., application code), through communications link 615 and communication interface 614. Received program code may be executed by processor 607 as it is received, and/or stored in disk drive 610 or other non-volatile storage for later execution. Computer system 600 may communicate through a data interface 633 to a database 632 on an external data repository 631. A module as used herein can be implemented using any mix of any portions of the system memory 608, and any extent of hard-wired circuitry including hard-wired circuitry embodied as a processor 607.

In the foregoing specification, the disclosure has been described with reference to specific embodiments thereof. It will, however, be evident that various modifications and changes may be made thereto without departing from the broader spirit and scope of the disclosure. For example, the above-described process flows are described with reference to a particular ordering of process actions. However, the ordering of many of the described process actions may be changed without affecting the scope or operation of the disclosure. The specification and drawings are, accordingly, to be regarded in an illustrative sense rather than restrictive sense.

What is claimed is:

1. A computer implemented method for query-level access by a database engine to an external distributed file system, the method comprising:
   identifying a query against external data, the external data being queried as a table;
   identifying one or more external locations for the external data, wherein the one or more external locations are on the external distributed file system;
   identifying metadata that specifies code to execute operational directives to operate against the external data in the external distributed file system;
   operating against the external data in external files that are in the external distributed file system, wherein one or more results files are generated from operating against the external data; and
   retrieving data from the one or more results files from the external distributed file system without copying the data from the one or more results files to one or more table files on the database engine by:
      streaming the data to one or more parallel query engines, wherein the one or more parallel query engines process the data, and
      outputting the data from the one or more parallel query engines to a user application.

2. The method of claim 1, wherein the query is an SQL query.

3. The method of claim 1, wherein the database engine comprises:
   one or more parallel query engines;
   an external table engine; and
   one or more storage disks.

4. The method of claim 1, wherein the metadata specifies a preprocessor codec.

5. The method of claim 4, wherein the streaming comprises executing the preprocessor codec over at least a portion of the data from the one or more results files resulting from the query.

6. The method of claim 1, wherein the one or more external locations is a pathname to one or more files in the external distributed file system.

7. The method of claim 1, further comprising running a map-reduce process on the external distributed file system to populate data into the one or more results files.

8. A computer system for query-level access by a database engine to an external distributed file system, comprising:
   a computer processor to execute a set of program code instructions; and
   a memory to hold the program code instructions, in which the program code instructions comprises program code to perform:
   identify a query against external data, the external data being queried as a table;
   identify one or more external locations for the external data, wherein the one or more external locations are on the external distributed file system;
   identify metadata that specifies code to execute operational directives to operate against the external data in the external distributed file system;
   operate against the external data in external files that are in the external distributed file system, wherein one or more results files are generated from operating against the external data; and
   retrieve data from the one or more results files from the external distributed file system without copying the data from the one or more results files to one or more table files on the database engine by:
      streaming the data to one or more parallel query engines, wherein the one or more parallel query engines process the data, and
      outputting the data from the one or more parallel query engines to a user application.

9. The computer system of claim 8, wherein the query is an SQL query.

10. The computer system of claim 8, wherein the database engine comprises:
    one or more parallel query engines;
    an external table engine; and
    one or more storage disks.

11. The computer system of claim 8, wherein the metadata specifies a preprocessor codec.

12. The computer system of claim 11, wherein the streaming comprises executing the preprocessor codec over at least a portion of the data from the one or more results files resulting from the query.

13. The computer system of claim 8, wherein the one or more external locations is a pathname to a file in the external distributed file system.

14. The computer system of claim 8, in which the program code instructions further comprises program code to run a map-reduce process on an external database system to populate data into the one or more results files.

15. A computer program product embodied in a non-transitory computer readable medium, the computer readable medium having stored thereon a sequence of instructions which, when executed by a processor causes the processor to execute a process to perform query-level access by a database engine to an external distributed file system, the process comprising:

identifying a query against external data, the external data being queried as a table;

identifying one or more external locations for the external data, wherein the one or more external locations are on the external distributed file system;

identifying metadata that specifies code to execute operational directives to operate against the external data in the external distributed file system;

operating against the external data in external files that are in the external distributed file system, wherein one or more results files are generated from operating against the external data; and retrieving data from the one or more results files from the external distributed file system without copying the data from the one or more results files to one or more table files on the database engine by:

streaming the data to one or more parallel query engines, wherein the one or more parallel query engines process the data, and outputting the data from the one or more parallel query engines to a user application.

16. The computer program product of claim 15, wherein the query is an SQL query.

17. The computer program product of claim 15, wherein the database engine comprises:

one or more parallel query engines;

an external table engine; and one or more storage disks.

18. The computer program product of claim 15, wherein the metadata specifies a preprocessor codec.

19. The computer program product of claim 18, wherein the streaming comprises executing the preprocessor codec over at least a portion of the data from the one or more results files resulting from the query.

20. The computer program product of claim 15, wherein the one or more external locations is a pathname to a file in the external distributed file system.

* * * * *

UNITED STATES PATENT AND TRADEMARK OFFICE
CERTIFICATE OF CORRECTION

PATENT NO. : 9,589,036 B2  
APPLICATION NO. : 13/564204  
DATED : March 7, 2017  
INVENTOR(S) : Hanckel et al.

Page 1 of 1

It is certified that error appears in the above-identified patent and that said Letters Patent is hereby corrected as shown below:

On the Title Page

Column 2, under Other Publications, Line 6, delete "Federartion"," and insert -- Federation", --, therefor.

Signed and Sealed this
Twenty-second Day of August, 2017

Joseph Matal
*Performing the Functions and Duties of the*
*Under Secretary of Commerce for Intellectual Property and*
*Director of the United States Patent and Trademark Office*